United States Patent [19]

Harmon

[11] Patent Number: 5,161,855
[45] Date of Patent: Nov. 10, 1992

[54] VEHICLE SEAT WITH BUILT-IN CHILD SEAT

[76] Inventor: Michael L. Harmon, 23897 CR 106, Elkhart, Ind. 46514-9787

[21] Appl. No.: 640,074

[22] Filed: Jan. 11, 1991

[51] Int. Cl.$^5$ ............................................. B60N 2/30
[52] U.S. Cl. ........................................ 297/238; 297/391
[58] Field of Search ............... 297/238, 484, 467, 391, 297/464

[56] References Cited

U.S. PATENT DOCUMENTS

| | | | |
|---|---|---|---|
| 3,791,694 | 2/1974 | Roberts et al. | 297/484 X |
| 4,540,216 | 9/1985 | Hassel, Sr. | 297/238 |
| 4,596,420 | 6/1986 | Vaidya | 297/238 X |
| 4,681,367 | 7/1987 | Timmers | 297/238 X |
| 4,756,573 | 7/1988 | Simin et al. | 297/238 X |
| 4,943,112 | 7/1990 | Law | 297/238 |

FOREIGN PATENT DOCUMENTS

| | | | |
|---|---|---|---|
| 1243930 | 11/1988 | Canada | 297/484 |
| 2023415 | 1/1980 | United Kingdom | 297/238 |

Primary Examiner—Peter R. Brown
Attorney, Agent, or Firm—James D. Hall

[57] ABSTRACT

A vehicle seat with built-in child safety seat including a five point restraint system directly anchored to the vehicle seat frame. Foldable headrests are provided which extend outwardly to form lateral headrests for a child carried by the child safety seat. The safety seat and headrests fold into the main vehicle seat back and are concealed when not in use.

2 Claims, 7 Drawing Sheets

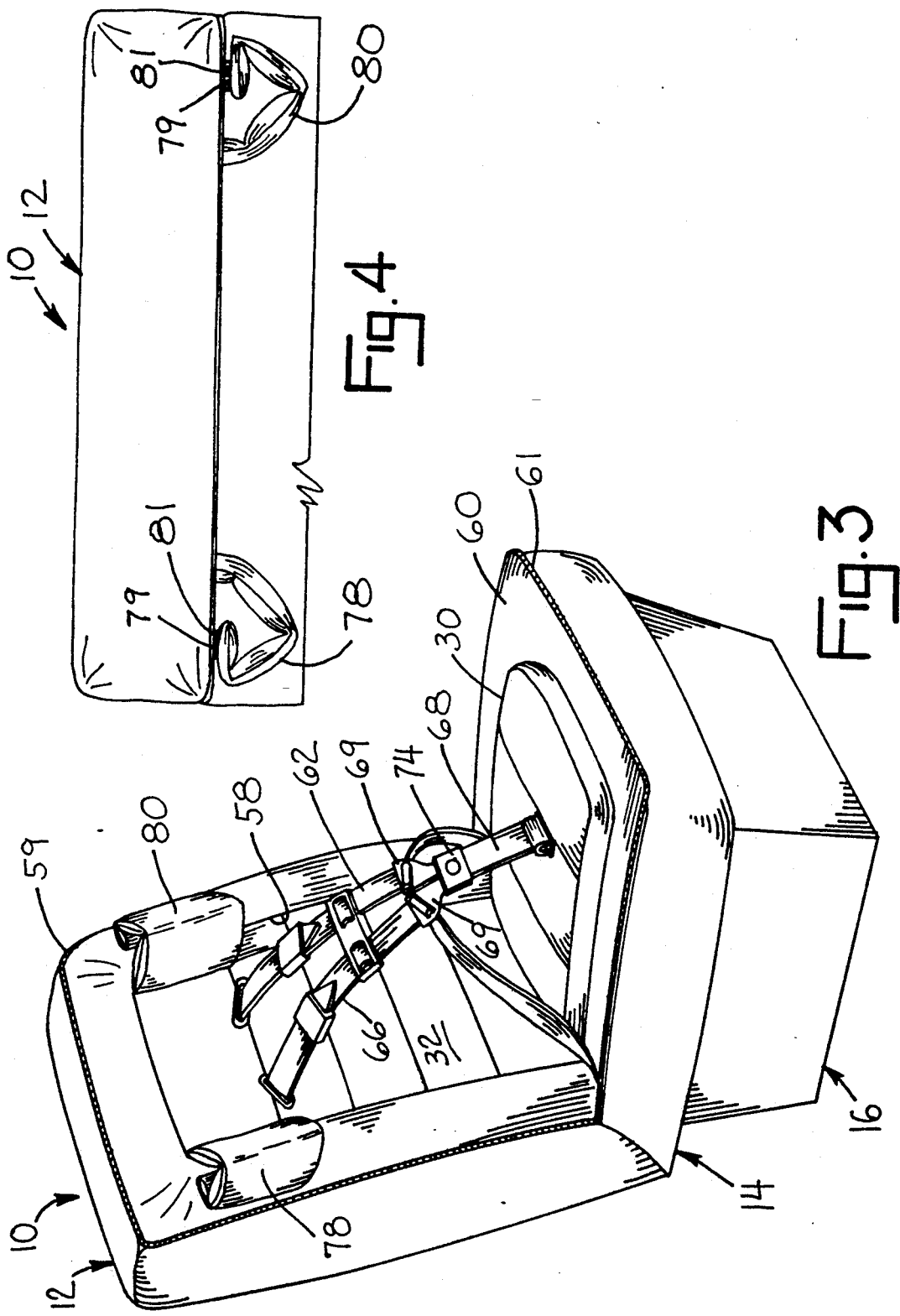

VEHICLE SEAT WITH BUILT-IN CHILD SEAT

FIELD OF THE INVENTION

This invention relates to a vehicle seat and has specific reference to a vehicle seat with a built-in child seat having a five point restraint system anchored to the vehicle seat frame.

BACKGROUND OF THE INVENTION

Vehicle seats having built-in child seats or provisions for infant or toddler seats are illustrated in U.S. Pat. Nos. 4,533,176; 4,540,216; 4,756,573; and 4,900,087. One problem with the child seats disclosed in the prior art patents is in the manner of attaching the child restraint harnesses and the child seat. The prior art generally connects the harnesses of the restraint system, more commonly referred to as seat belts and shoulder harnesses, to the frame for the child seat. Connection of the restraint system to the child seat frame may create an unsafe condition in a collision. The child seat frame under weight of the child in a collision may break free of the vehicle seat to permit the child and child seat to move freely within the vehicle interior creating a dangerous condition.

Further the prior art patents do not laterally support the child's head. This is especially bothersome when the child carried by the seat is sleeping and the head has a tendency to slump sideways.

SUMMARY OF THE INVENTION

The vehicle seat with built-in child seat of this invention eliminates the problems experienced above by anchoring the seat belts and shoulder harnesses of the child seat five point restraint system directly to the main vehicle seat frame. The five point restraint system when anchored directly to the vehicle seat frame functions independently of the child seat to safely hold the child and child seat in contact with the vehicle seat during a collision. Further, headrests integral with the vehicle seat are positioned on each side of the seat to provide lateral support for the child's head and to provide a support to lean the head against to sleep comfortably. When not in use the child seat and headrests are folded into a recess of the vehicle seat and concealed.

Accordingly, it is an object of the invention to provide for a novel vehicle seat.

Another object of the invention is to provide for a vehicle seat having a built-in child seat wherein the child restraint harnesses are connected directly to the vehicle seat frame.

Another object of the invention is to provide for a vehicle seat with built-in child seat having side head rest supports.

Other objects of the invention will become apparent upon a reading of the following description taken with the accompanying drawings.

BRIEF DESCRIPTION OF THE DRAWINGS

FIG. 3 is the perspective view of FIG. 2 with the child seat in the extended position with the harnesses and head rests in a use position.

FIG. 4 is a fragmented top plan view of FIG. 3.

DESCRIPTION OF THE PREFERRED EMBODIMENT

Figure 1:
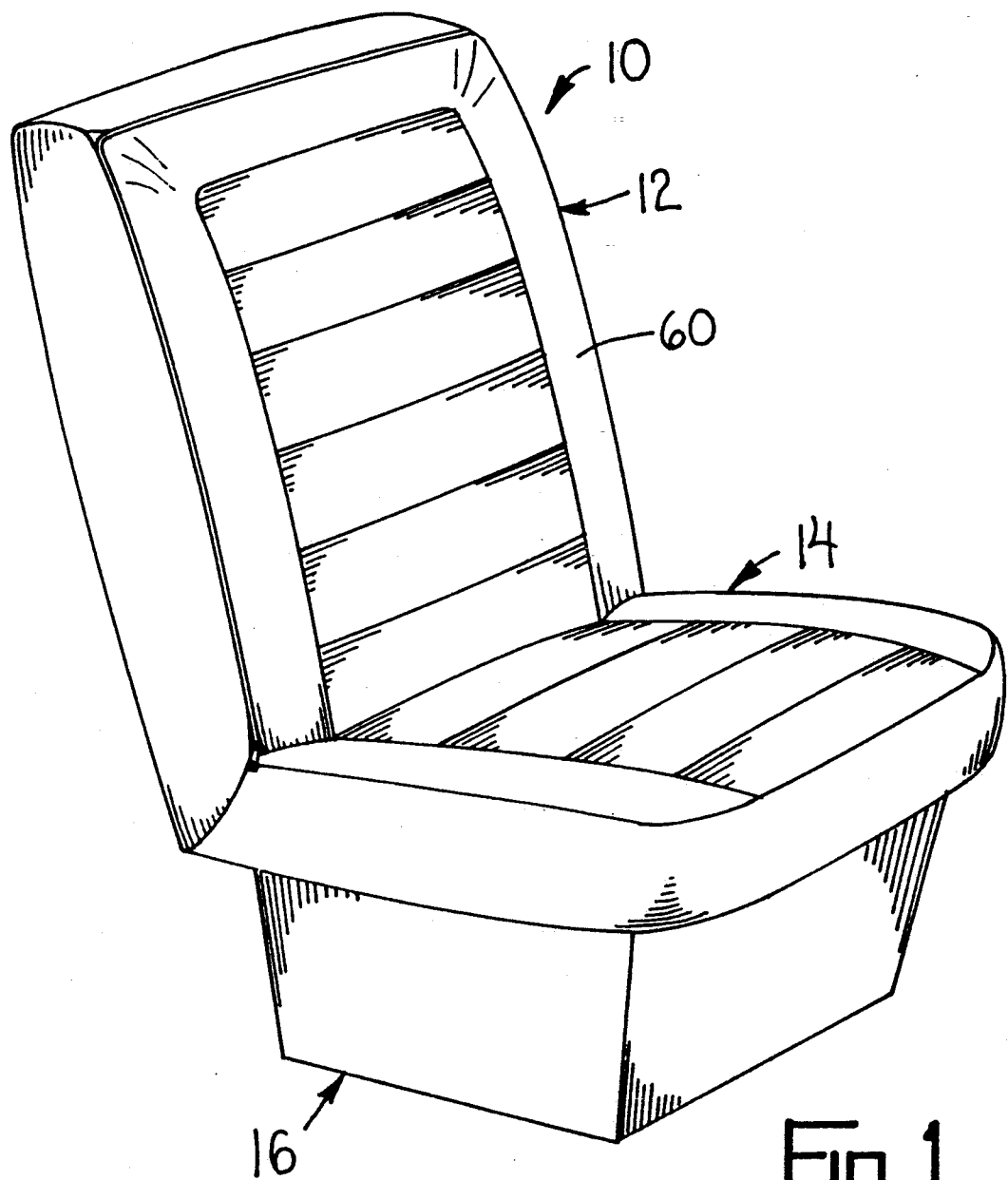
FIG. 1 is a perspective view of the vehicle seat of the invention with the child seat concealed by a front flap.

The preferred embodiment herein disclosed is not intended to be exhaustive or to limit the application to the precise form disclosed. Rather, it is chosen and described to enable others skilled in the art to utilize its teachings.

Referring now to the drawings, vehicle seat 10 is illustrated as including a back support 12 and a seat support 14 supported by a pedestal 16. Pedestal 16 is adapted for connection to the floor of a vehicle. Back support 12 includes an inverted U-shaped tubular frame 18 with generally horizontal cross braces 20 connected between the spaced apart frame legs 19. Seat support 14 includes a tubular C-shaped frame 22 having a plurality of seat springs not shown. Seat support frame 22 and back support frame 18 are pivotally interconnected by linkage 24 such that back support 12 may be inclined relative to the seat support 14. A stop 26 is connected to seat support frame 22 to contact linkage 24 and define the fully upright position of back support 12. A known recliner mechanism (not shown) is connected to seat 10 to provide for the controlled recline of the back support 12. An example of a known recliner mechanism may be found by referring to U.S. patent application Ser. No. 390,081 incorporated herein by reference. As thus far described, the construction of seat 10 is known and does not constitute a novel portion of the invention.

Figure 5:
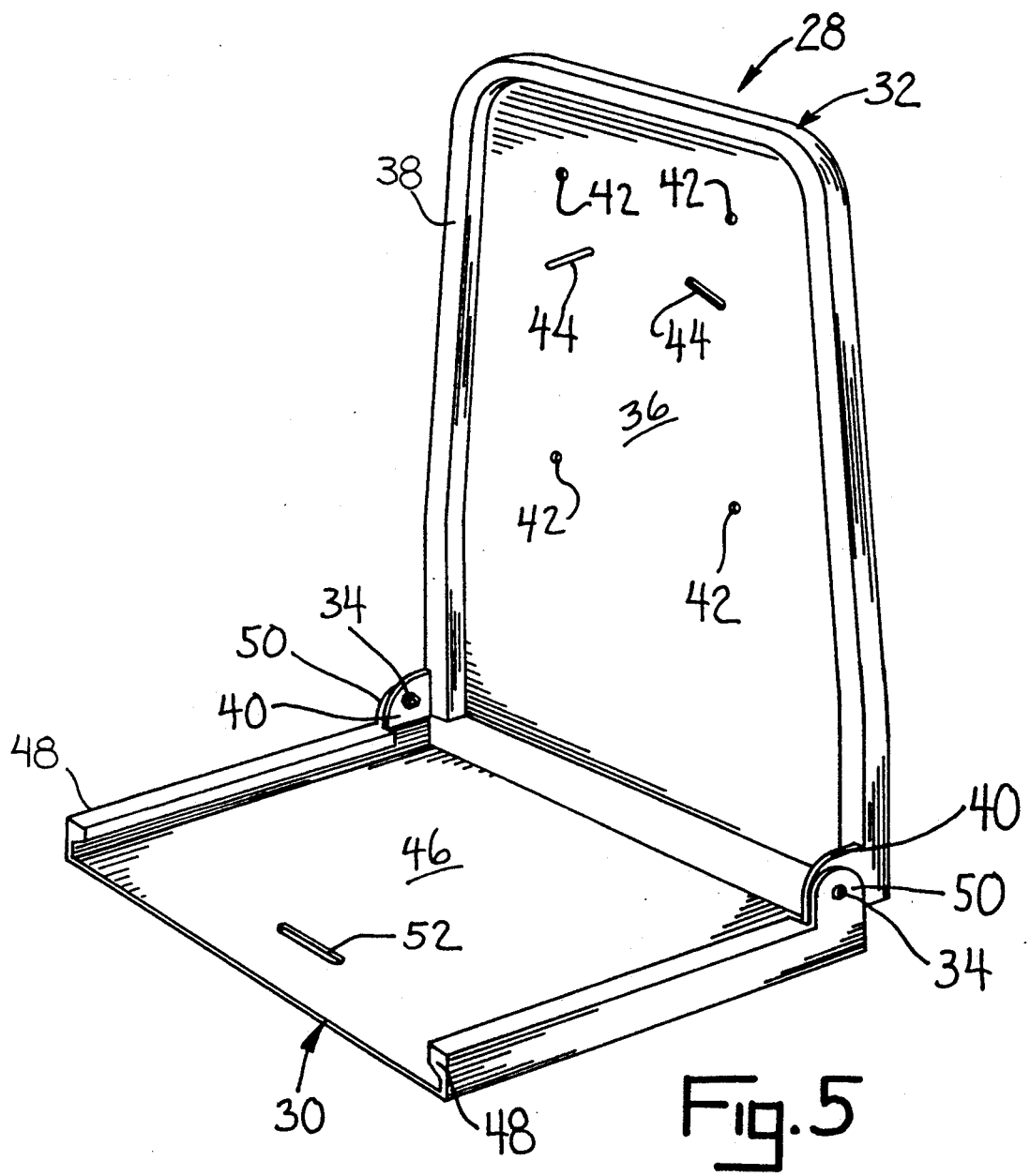
FIG. 5 is a perspective view of the child seat bottom and back.

A child seat frame 28 (best seen FIG. 5) is provided and includes a seat support 30 and a back support 32 hingedly connected to one another by fasteners 34 as illustrated. Back support 32 includes a back plate 36 with an integral peripheral lip 38. Ear tabs 40 extend outwardly from lip 38. A plurality of openings 42 are formed through back plate 36. Two slots 44 are also formed through back plate 36 in the angled orientation as shown in FIG. 5. Seat support 30 includes a bottom plate 46 integral with a pair of side rails 48. An ear tab 50 extends upwardly from an end of each side rail 48. Ear tabs 50 are adjacent tabs 40 and are connected thereto by fasteners 34 as mentioned for hinged movement of seat support 30 relative to back support 32. A slot 52 is formed through bottom plate 46.

Child seat frame 28 is connected to cross braces 20 of back support 12 by fasteners 54 traversing openings 42 in child seat back plate 36 and extending through openings in the cross braces 20. A nut is turned onto each fastener 54 to secure the child seat frame to back support frame 18.

Figure 2:
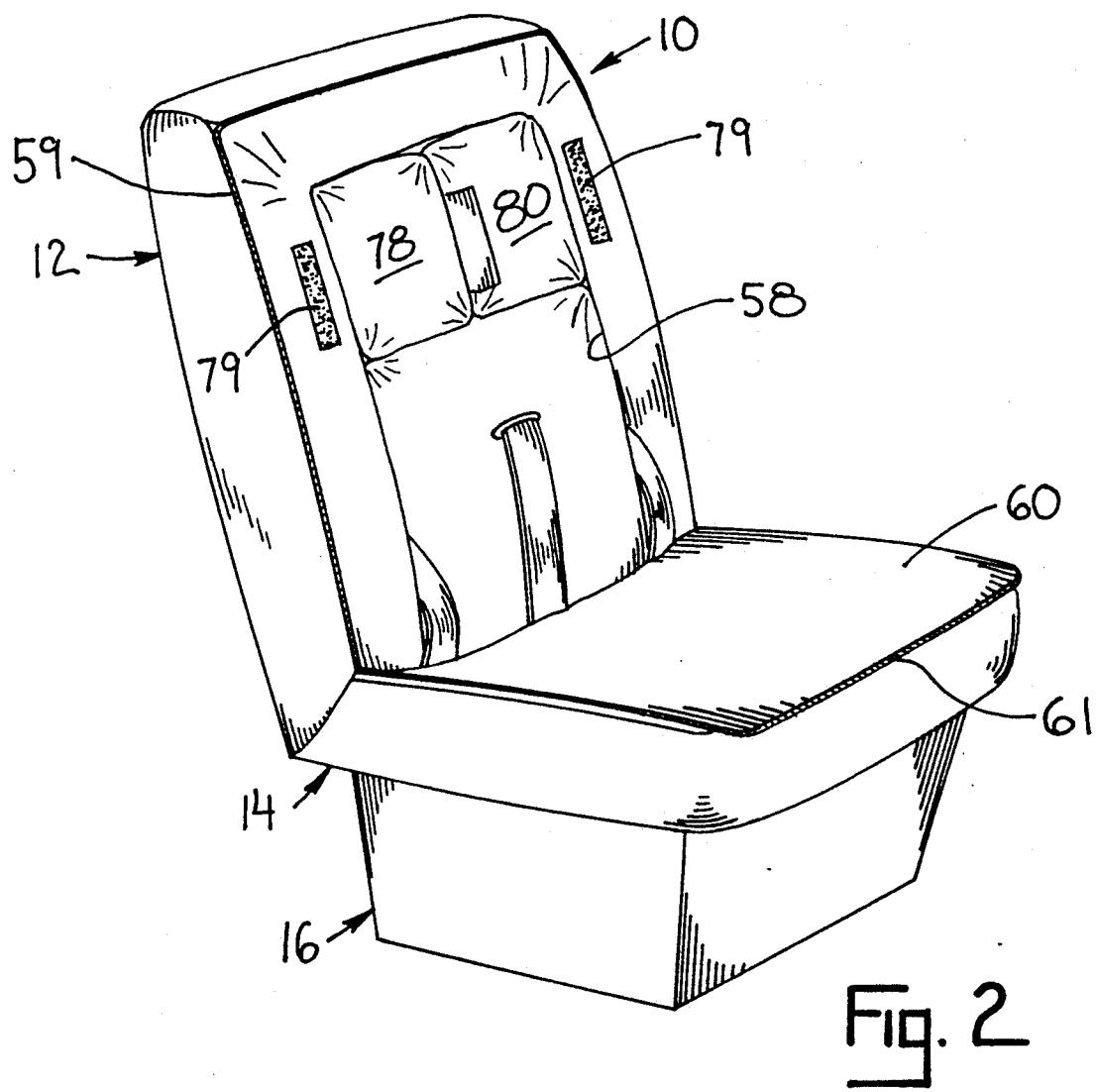
FIG. 2 is the perspective view of FIG. 1 with the front flap lowered and the child seat revealed and in a retracted or closed position.

Back support frame 18 and seat support frame 22 are upholstered for comfort. The upholstery for back support 12 and seat support 14 is shown in broken lines in FIGS. 6–8. Child seat support frame 28 and back support frame is also upholstered for comfort as shown in the figures. A recess 58 is formed in upholstery of back support 12 adjacent the upholstered child seat back support 32 as shown. The seat support 30 of child seat 28 is accommodated by recess 58 when the seat support is in its retracted position as shown in FIGS. 2 and 7. When retracted, seat support 30 fills a substantial portion of recess 58. A decorative outer flap 60 is connected at one end to back support 12. A zipper part 59 along the periphery of flap 60 and a zipper part 62 along the forward peripheral edge of support 12 is provided such that flap 60 may be fully connected to the back support in total concealment of the child seat as shown by reference to FIGS. 1 and 2.

Figure 6:
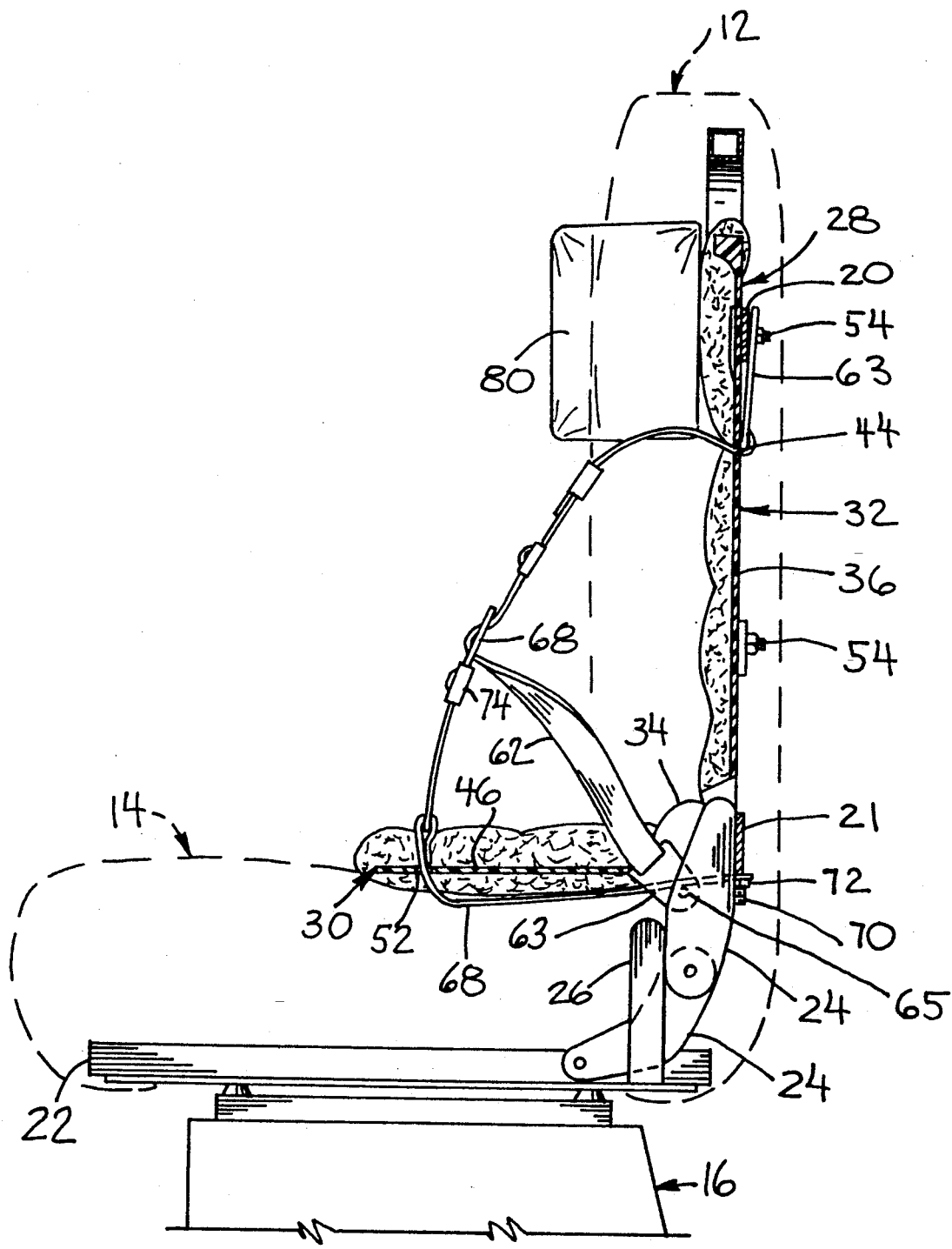
FIG. 6 is a side elevational view of the vehicle seat with the child seat attached and in its down or extended position. Portions are shown sectioned and other portions are shown in broken lines for illustrative purposes.
Figure 7:
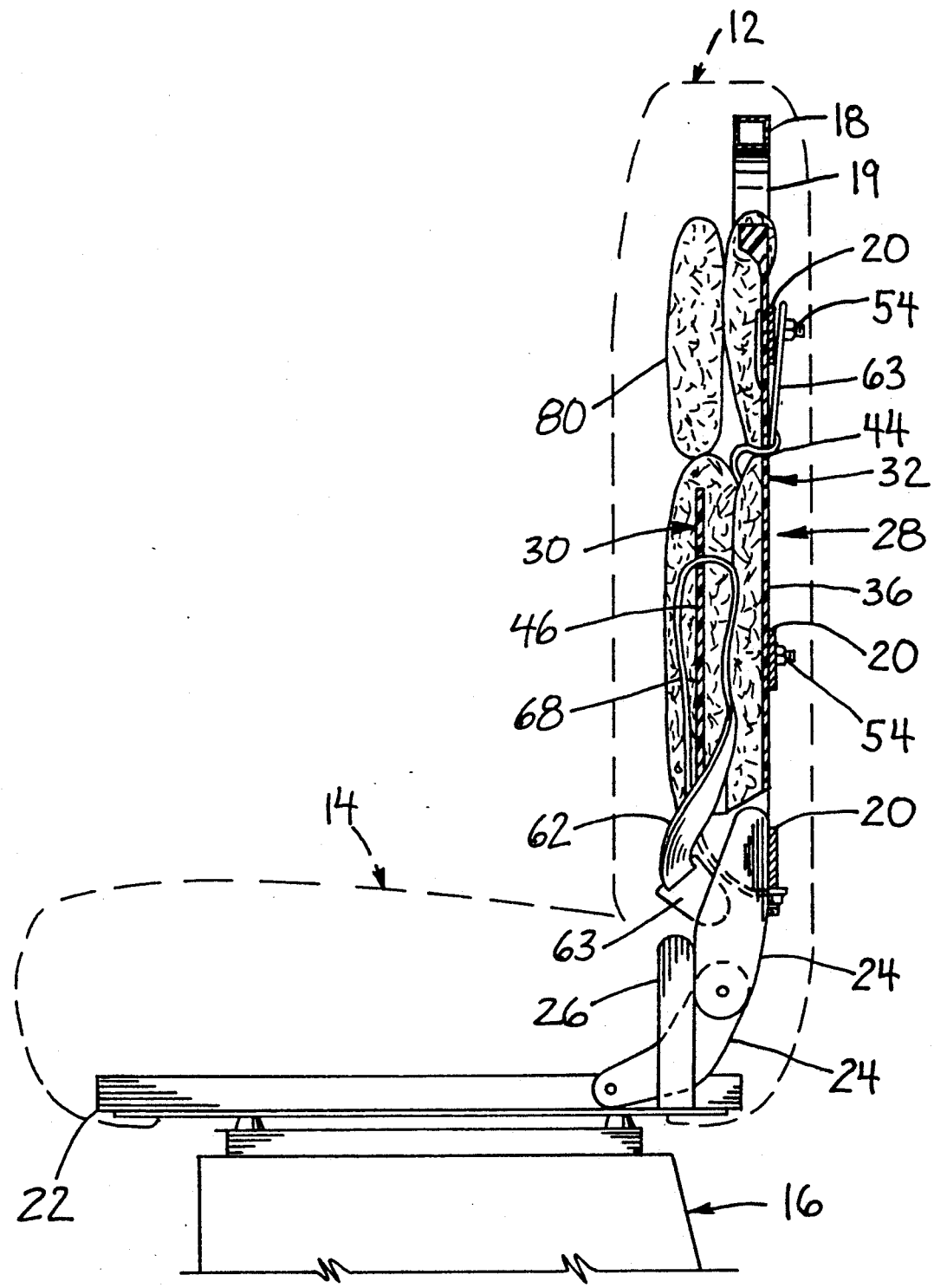
FIG. 7 is the side elevational view of FIG. 6 with the seat in the raised or retracted position.

As illustrated seat support 30 of the child seat is pivotal between a retracted or up position as shown in FIGS. 2 and 7 and a down or extended position as shown in FIGS. 3, 5 and 6. In the retracted position the seat support is accommodated within recess 58 such that when flap 60 is zippered or otherwise connected to back support 12 the appearance of the back support and comfort is not disrupted. When flap 60 is unzipped or otherwise substantially disconnected from back support 12 it overlies seat support 14 and forms a protective barrier for the seat support upholstery. Child seat support 30 is pulled downwardly for use and rests on seat support 14 (covered by flap 60). As back support 12 is reclined in a common manner relative to seat support 14, child back support 32 follows back support 12 to recline relative to the child seat support 30.

Figure 8:
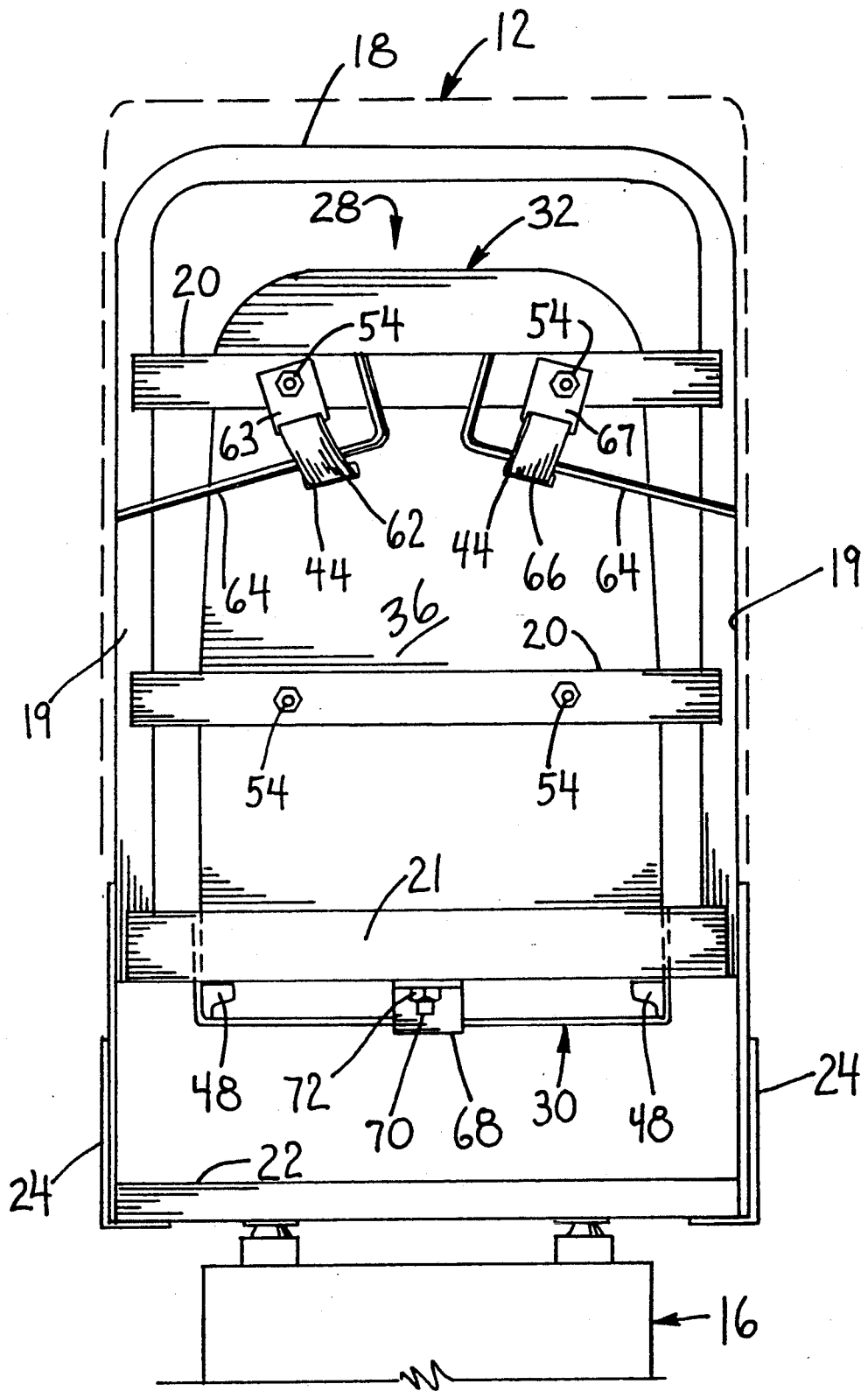
FIG. 8 is a rear elevational view of the vehicle seat frame and child seat of FIG. 6.

To safely retain a child within the child seat a five point restraint system including a plurality of straps or harnesses is provided. A shoulder strap 62 terminating in metal tips 63 is connected at one end to linkage 24 by a fastener 65. The strap 62 is threaded through an opening formed in the upholstery of child seat back support 32 and through a slot 44. The other tip 63 of strap 62 is connected by a fastener 54 to a cross brace 20 of the back support frame 18 as shown in FIGS. 6-8. As is further shown in FIG. 8, two L-shaped rods 64 are connected between a cross brace 20 and a leg 19 of tubular frame 18 at an angle substantially corresponding to the angle of slots 44. Strap 62 contacts a rod 64. Rod 64 provides strain relief for strap 62. Similarly a strap 66 includes a metal tip 67 at each end (only one shown). As with strap 62 one end of strap 66 (not shown) is connected in a similar manner to a linkage (not shown) of back support 12 by a fastener on the opposite side of end 63 of strap 62. The strap 66 is threaded through an opening in the upholstery and through the other notch 44 of back plate 36. A tip 67 of strap 66 is connected by a fastener 54 to a cross brace 20 such that strap 66 contacts rod 64 as shown so that the rod provides strain relief for the strap. A male connector 69 is slidably carried on each strap 62, 66. A crotch strap 68 extends through slot 52 in bottom plate 46 and through the upholstery of bottom plate 46. Crotch strap 68 extends along the lower surface of bottom plate 46 and is connected at one to a cross bar 21 by a fastener 70 and a nut 72. The other end of crotch strap 68 terminates in a female connector 74.

In use, a child is positioned on the child seat with crotch strap 68 positioned between the child's legs. The child's neck is substantially between straps 62, 66 as they pass through the child seat back plate. The straps 62, 66 pass over the child's shoulders and male connectors 69 are snap fitted within connector 74 in a known manner such that the lower portion of each strap 62, 66 in combination form a lap belt. Such construction is referred to as a five point harness and may take on many variations within the teachings of this invention. It is important that each of the straps be directly anchored to the vehicle seat frame. Directly anchoring the straps or harnesses to the seat frame provides a safer child confinement over the prior art in the eventuality of a collision.

When the child seat is not in use the straps may be folded between the child seat support and child back support. Flap 60 is then fully connected to the back support 12 as previously described.

To provide lateral head support for the child carried by the seats cushions 78 and 80 are sewn along opposite side edges to back support 12 interior to recess 58. Cushions 78, 80 are positionable in a closed position to span the upper portion of recess 58 above child seat support 30 when retracted. (See FIG. 2). Pillows 78, 80 fill the void above the seat support 30 when the child seat is not in use. As illustrated in FIG. 2 one part 79 of a hook and pile fastener strip commonly referred to as Velcro ® is connected to each side of seat back support 12 adjacent cushions 78, 80. Each pillow carries a mating part 81 of the hook and pile fastener. In use cushions 78, 80 are folded in the manner shown in FIGS. 3 and 4 to form side head rests for a child carried by child seat 28. The cushions are retained in this orientation by the hook and pile fasteners 79, 81 in a well known manner. The width of each cushion 78, 80 is longer than the distance between the edges of recess 58 and the hook and pile fastener strips 79. Therefore, when folded outwardly and the hook and pile fasteners are engaged the cushions bow in the manner illustrated best in FIG. 4 to form side head rests for a child carried by seat 28.

It should be understood that the invention is not limited to the details above but may be modified within the scope of the appended claims.

I claim:

1. A vehicle seat including a back support frame connected to a seat support frame, said back support frame and said seat support frame being upholstered, a child seat having a back support and a seat support connected to said back support frame, said upholstered back support including a recessed portion adjacent said child seat back support, and headrest means pivotably connected to said upholstered back support shiftable between a retracted position for occupying an upper portion of said recess and an extended position for forming spaced lateral headrests for said child seat, each lateral headrest having fastening means independent of its pivotal connection to said upholstered back support, said fastening means being detachably connected to the upholstered back support when said headrest means is in its said extended position.

2. The vehicle seat of claim 1 wherein each headrest is folded back onto itself in said extended position and is connected to said upholstered back support by said fastening means.

* * * * *